Sept. 4, 1951 C. K. STUDLEY, JR 2,567,133
DECIMAL INDICATOR
Filed Aug. 27, 1949
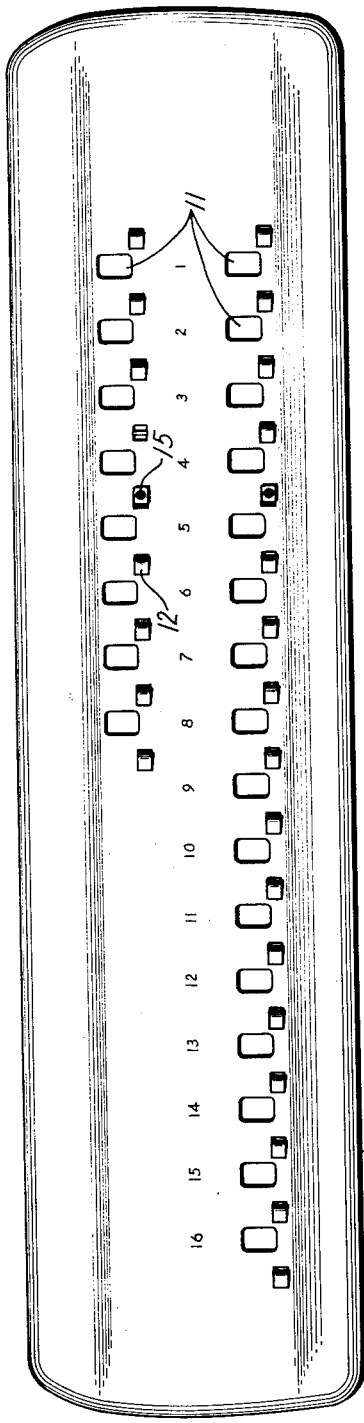
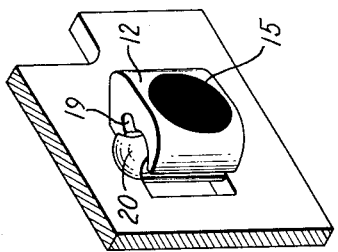
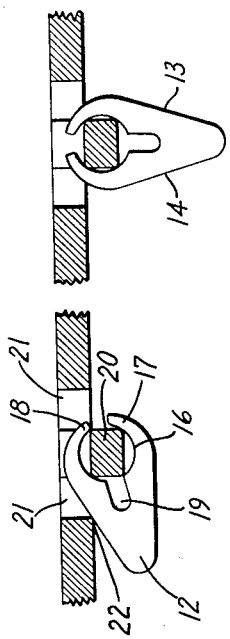
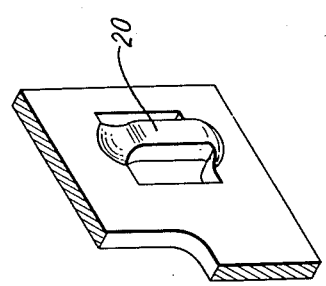
INVENTOR:
Clarence K. Studley Jr.
BY
Howard M. Dustin.

Patented Sept. 4, 1951

2,567,133

UNITED STATES PATENT OFFICE 2,567,133

DECIMAL INDICATOR

Clarence K. Studley, Jr., Berkeley, Calif., assignor to Marchant Calculating Machine Company, a corporation of California Application August 27, 1949, Serial No. 112,663

3 Claims. (Cl. 235—1)

1

The present invention relates to decimal indicating devices for the registers of calculating machines and the like.

Registers having manually settable decimals have heretofore been provided with bars upon which the decimal indicators are mounted for sliding movement to the selected decimal positions. It has been found that when such decimals are mounted for easy sliding movements, the decimal positions cannot be dependably maintained during continued use of the machine; while conversely, when mounted more securely, the adjustment of the decimal indicators to different decimal positions becomes more difficult.

The present invention contemplates the provision of individual decimal indicators, one for each decimal position of the registers. Each indicator consists of a carrier or flap which is mounted on a fixed pivot on the carriage cover. One face of each carrier has a decimal point delineated thereon, while the opposite face is plain. When decimal point indication at a selected position is desired, the carrier is flipped over to expose the decimal point to view, while the others lie with their plain faces exposed to conceal the decimal points in the other respective positions.

It is therefore a principal object of the invention to provide manually settable decimal carriers which will dependably maintain the decimal setting.

It is a further object to fix a plurality of individual decimal carriers relative to their respective numeral wheels of a register and to make it possible to expose or conceal the decimal points delineated on the carriers.

It is a further object to mount the decimal indicators on the shiftable carriage of a calculating machine so that the shifting movement of the carriage will not disturb the setting of the decimal indicators.

Other objects and advantages of the invention will appear from the following description, reference being had to the accompanying drawing, in which:

Fig. 1 is a front view of the carriage cover of a calculating machine equipped with a plurality of decimal indicators.

Fig. 2 is an enlarged perspective view of a part of the carriage cover showing an extrusion which forms the pivotal mounting for the decimal indicator.

Fig. 3 is an enlarged sectional view showing the decimal indicator and its pivotal mounting, the indicator being shown in the position it assumes when the decimal point is concealed.

2

Fig. 4 is an enlarged sectional view of the decimal indicator shown midway between the position shown in Fig. 3 and that shown in Fig. 5.

Fig. 5 is an enlarged perspective view of a portion of the carriage cover and the decimal indicator, the indicator being shown in the position it assumes when the decimal point is exposed to view.

The decimal indicating devices, shown in the drawings to illustrate the present invention, are mounted on the cover 10 (Fig. 1) of a carriage which is transversely shiftable in a conventional manner. The cover is provided with openings or windows 11 through which the numerals of the numeral wheels may be read. The body of each decimal indicating device is in the form of a flap 12 (Fig. 3) which has two angularly disposed faces 13 and 14 (Fig. 4). The face 13 is plain and preferably matches the color of the cover, while face 14 bears a decimal point indicia 15 of contrasting color.

The flaps are pivotally mounted on extrusions 20 on the carriage cover and each extrusion is so located relative to the numeral wheel openings 11 that the respective decimal indicia, when exposed, lie midway between the openings.

Each flap is mounted on an extrusion by means of two yieldable prongs 17 and 18 (Fig. 3) which embrace the extrusion and the prongs are arcuately shaped to form a vertical hole 16 in which the extrusion is disposed. A slot 19, parallel with the axis of the hole 16, provides additional flexibility for the prongs so the latter will spring outwardly and snap over the extrusion when the flap is mounted on the cover. After such mounting the prongs yieldably embrace the extrusion and resist movement of the flap from either of its adjusted positions shown in Figs. 3 and 5.

The openings 21 on either side of the extrusions permit movement of the prongs when the flap is adjusted from one position to another, and the edge 22 of the cover, forming one side of an opening 21, serves as a stop to arrest the flap when the exposed face of the flap is parallel to the carriage cover. The tip of the flap extends angularly outwardly from the face of the cover beyond the point of contact with the cover and thus provides a space between the tip and the surface of the cover so that the flap may be grasped and easily adjusted from one position to the other.

The surface of the cover upon which the decimal indicators are mounted is at an appreciable angle varying in different calculators from 45 to 55 degrees from perpendicular and consequently the force of gravity tends to hold the flap in adjusted position. Furthermore, the shifting movement of the carriage is in a direction parallel to the plane of the cover which carries the decimal indicators and, as will be seen in Fig. 3, such shifting movement has no tendency to disturb the setting of the flaps.

I claim:

1. A decimal indicating device for a calculating machine having a carriage transversely shiftable relative to the machine, a series of numeral wheels mounted in the carriage and a cover provided with an opening adjacent each of said numeral wheels, the decimial indicating devices comprising a series of movable flaps mounted on said cover intermediate said openings; each of said flaps having a bifurcate edge and bearing decimal indicia on one side only, a series of extrusions formed on the cover each constituting a pivotal mounting embraced by the bifurcate edge of the flap, said extrusions lying substantially parallel to the general plane of the cover and normal to the direction of carriage shifting movement.

2. A decimal indicating device for a calculating machine having a register and a cover therefor, said device comprising a flap having two angularly disposed faces on either side thereof, a decimal indicia delineated on one of said faces, said flap being forked and formed with arcuate resilient prongs at one edge thereof, a pivot member of angular cross-section carried by the cover and positioned above an aperture formed therein, said pivot member being frictionally engaged within the prongs of the forked edge of said flap for movement of the flap from one position to another, said aperture presenting opposite edges each positioned to contact a respective face of the flap for limiting its movement to positions in which one or the other of its faces lies in a plane parallel to the plane of the cover.

3. A decimal indicating device for a calculating machine having a register and a cover therefor; said device comprising a tapered flap having two angularly opposed faces, a decimal indicia delineated on one of said faces, said cover having an aperture therein, a pivot member carried by said cover above and extending across said aperture, means on said flap frictionally engaged with said pivot member for pivotal movement of said flap relative to said member and cover in a plane normal to said angular faces, to expose either of the angular faces of the flap; said aperture presenting opposite edges parallel to said pivot member, each positioned to contact an unexposed face of the flap to limit its movement to positions in which the exposed face lies in a plane substantially parallel to the plane of the cover.

CLARENCE K. STUDLEY, Jr.

REFERENCES CITED

The following references are of record in the file of this patent:

UNITED STATES PATENTS

| Number | Name | Date |
| --- | --- | --- |
| 280,375 | Horton | July 3, 1883 |
| 974,937 | Wales | Nov. 8, 1910 |
| 2,329,190 | Ellerbeck | Sept. 14, 1943 |

FOREIGN PATENTS

| Number | Country | Date |
| --- | --- | --- |
| 573,154 | Germany | Mar. 28, 1933 |